US009792266B1

(12) United States Patent
Armstrong et al.

(10) Patent No.: US 9,792,266 B1
(45) Date of Patent: Oct. 17, 2017

(54) CONTENT SYNCHRONIZATION ACROSS DEVICES

(71) Applicant: Amazon Technologies, Inc., Seattle, WA (US)

(72) Inventors: Patrick Joseph Armstrong, Seattle, WA (US); Yousef Zachary Khwaja, Seattle, WA (US); Sajeeva Lakmal Bandara Pallemulle, Woodinville, WA (US); Vincent Roseberry, Seattle, WA (US); Arun Sundaram, Seattle, WA (US); Ameet Nirmal Vaswani, Bellevue, WA (US); Leonardo Davi Viccari, Seattle, WA (US); Li Yan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 315 days.

(21) Appl. No.: 14/563,984

(22) Filed: Dec. 8, 2014

(51) Int. Cl.
*G06F 17/22* (2006.01)
*G06F 17/21* (2006.01)
*G06F 17/30* (2006.01)

(52) U.S. Cl.
CPC ........ *G06F 17/2247* (2013.01); *G06F 17/211* (2013.01); *G06F 17/30902* (2013.01)

(58) Field of Classification Search
CPC .............. G06F 17/2247; G06F 17/211; G06F 17/30902; G06F 17/212; H04M 1/72525; H04W 28/0284; H04W 28/0231; H04L 67/06
See application file for complete search history.

(56) References Cited

U.S. PATENT DOCUMENTS

| 7,028,306 B2 * | 4/2006 | Boloker ............ G06F 8/38 719/310 |
| 7,523,158 B1 * | 4/2009 | Nickerson ........ G06F 17/3089 709/203 |
| 7,685,260 B2 * | 3/2010 | Fukuda ............ G06F 17/3089 709/219 |

(Continued)

OTHER PUBLICATIONS

Meredith, Leslie, "Chrome Browser to Sync Across Devices and Save Web Pages," downloaded from http://blog.laptopmag.com/chrome-browser-to-sync-across-devices-and-save-web-pages 1/, 3 pages, (May 16, 2012).

*Primary Examiner* — Maikhanh Nguyen
(74) *Attorney, Agent, or Firm* — Klarquist Sparkman, LLP

(57) ABSTRACT

Techniques and solutions are described for content synchronization across devices. A web page currently being viewed at a first device associated with a user profile of a user can be identified. Browsing information for the page (such as URL, scrolling location, and a DOM element) may be stored in the profile. The DOM element may be associated with page content displayed during a browsing session in a viewport while the web page is at the current scrolling location. The browsing information may be updated dynamically, upon detecting a change in the current scrolling location of the page at the first device. A request for displaying the web page at a second device associated with the user profile may be received. The browsing information for the web page may be provided to the second device, so that the web page with the current scrolling location is displayed at the second device.

19 Claims, 10 Drawing Sheets

(56) References Cited

U.S. PATENT DOCUMENTS

| | | | | |
|---|---|---|---|---|
| 8,225,191 B1* | 7/2012 | Kalman | ............ | G06F 17/30873 |
| | | | | 707/620 |
| 8,275,859 B2* | 9/2012 | Burckart | ................ | H04L 67/02 |
| | | | | 709/203 |
| 8,793,573 B2* | 7/2014 | Beckmann | .......... | G06F 17/3089 |
| | | | | 715/235 |
| 9,104,775 B2* | 8/2015 | Kujda | ............... | G06F 17/30899 |
| 2003/0101235 A1* | 5/2003 | Zhang | .................... | H04L 51/04 |
| | | | | 709/218 |
| 2006/0224973 A1* | 10/2006 | Albrecht | ............... | G06F 9/4443 |
| | | | | 715/760 |
| 2007/0143672 A1* | 6/2007 | Lipton | .............. | G06F 17/30899 |
| | | | | 715/205 |
| 2007/0283011 A1* | 12/2007 | Rakowski | ........... | H04L 41/0803 |
| | | | | 709/225 |
| 2008/0301562 A1* | 12/2008 | Berger | ................ | G06F 17/3089 |
| | | | | 715/733 |
| 2009/0100356 A1* | 4/2009 | Kujda | .................. | G06F 17/212 |
| | | | | 715/760 |
| 2011/0258538 A1* | 10/2011 | Liu | .................... | G06F 17/2211 |
| | | | | 715/256 |
| 2012/0254727 A1* | 10/2012 | Jain | .................. | G06F 17/30905 |
| | | | | 715/234 |
| 2014/0122995 A1* | 5/2014 | Beckmann | .......... | G06F 17/3089 |
| | | | | 715/234 |
| 2014/0136942 A1* | 5/2014 | Kumar | ............. | G06F 17/30902 |
| | | | | 715/229 |
| 2014/0136971 A1* | 5/2014 | Kumar | ............. | G06F 17/30902 |
| | | | | 715/273 |
| 2014/0136973 A1* | 5/2014 | Kumar | ............. | G06F 17/30902 |
| | | | | 715/274 |

\* cited by examiner

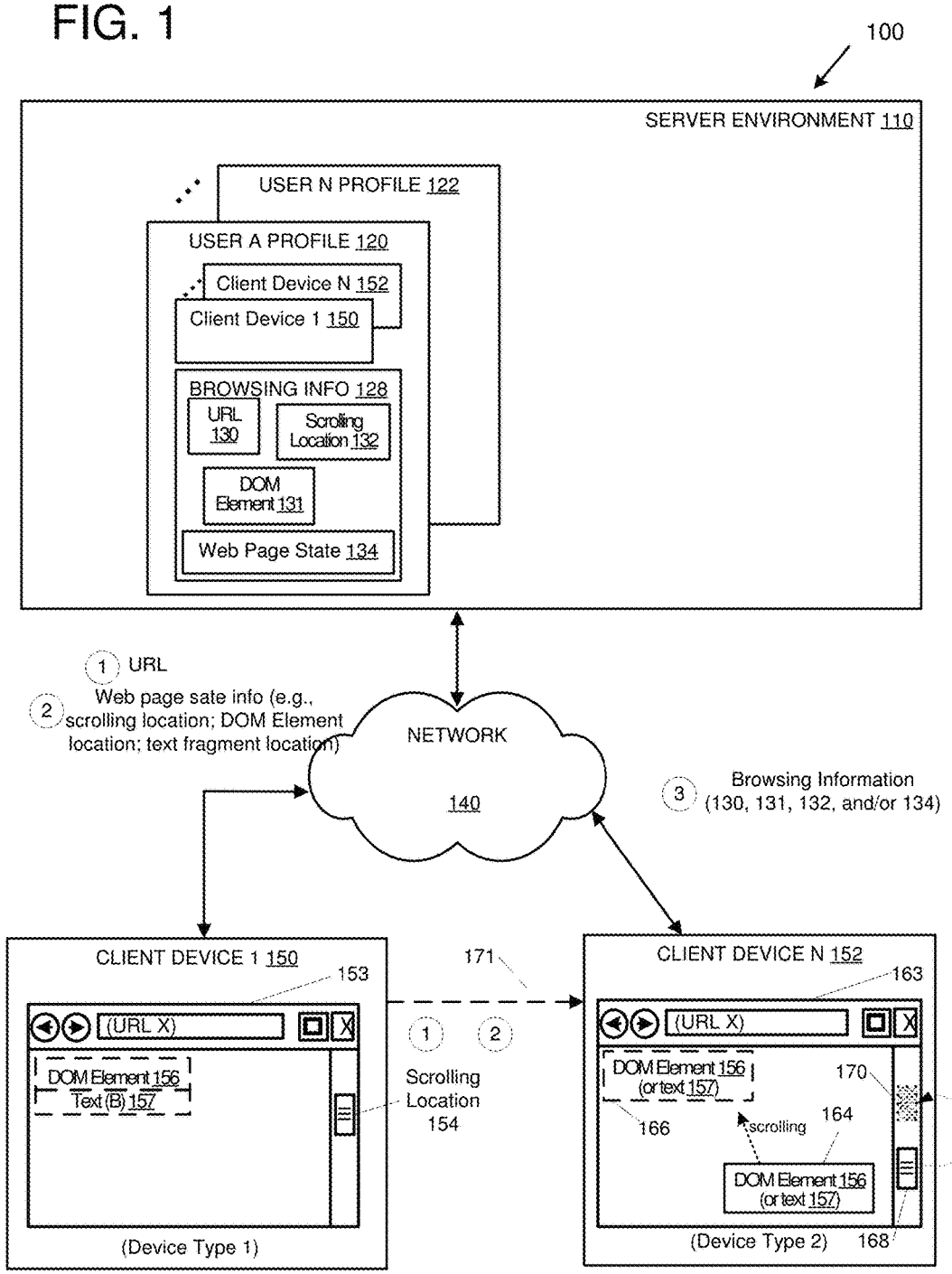

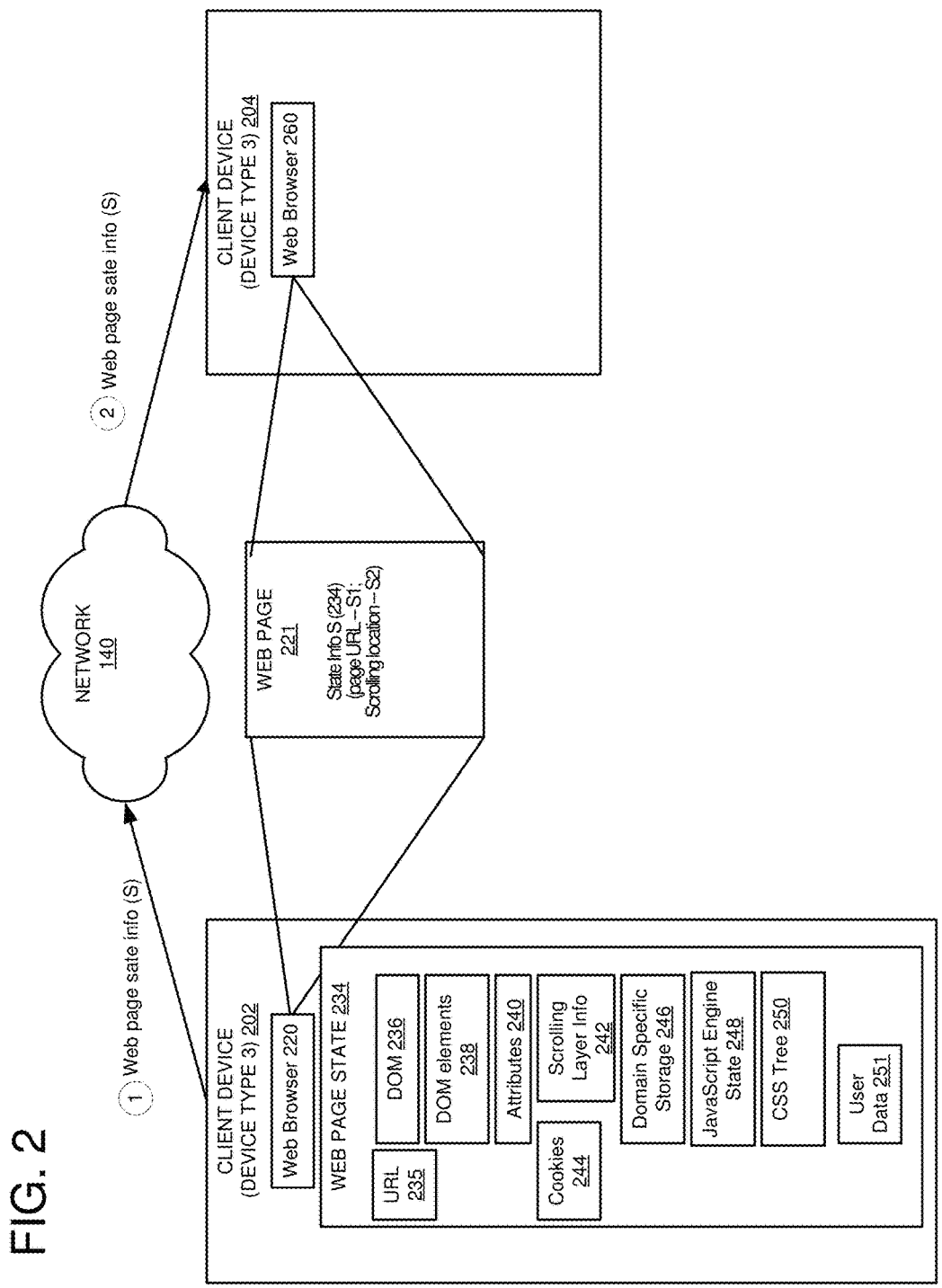

CONTENT SYNCHRONIZATION ACROSS DEVICES

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

FIG. 1 is a block diagram depicting an example environment for synchronizing content between devices of different types, in accordance with an example embodiment of the disclosure.

FIG. 2 is a block diagram depicting an example environment for synchronizing content between devices of the same type, in accordance with an example embodiment of the disclosure.

DETAILED DESCRIPTION

Figure 3A:
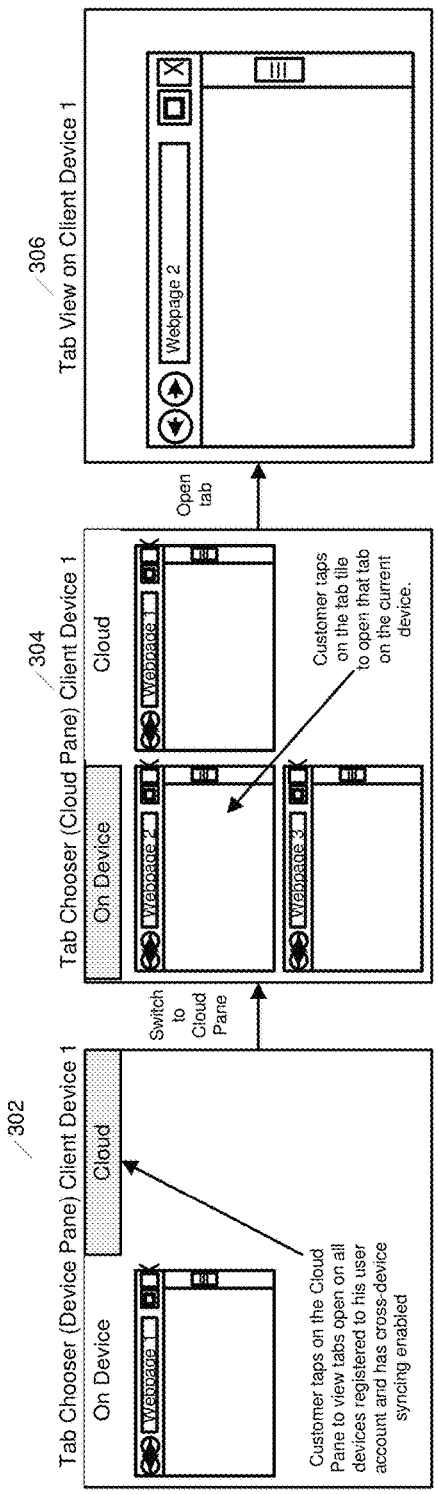
FIG. 3A is a block diagram depicting user interfaces which may be used when opening a tab not present at a current device.

The following description is directed to techniques and solutions for content synchronization across devices. More specifically, tab synchronization across devices may synchronize a web page URL as well as the reading (or scrolling) position of a web page. For a web page displayed at a first computing device, various state information (e.g., URL, page scrolling position, one or more DOM elements, and/or position of a text string) may be tracked and used at a second computing device for content synchronization (e.g., display the web page at the second device, including scrolling the web page to a read position last used at the first device). In instances when a web page is modified (e.g., optimized) for display at the second device based on device characteristics, semantic information (e.g., location of a DOM element associated with a specific text string in the page content) may be used to track and synchronize the last read position from one device to another.

FIG. 1 is a block diagram depicting an example environment for synchronizing content between devices of different types, in accordance with an example embodiment of the disclosure. Referring to FIG. 1, the example environment 100 includes a server environment 110, which may include one or more servers (e.g., web servers and content servers) that provide web pages and associated resources to devices performing web browsing operations (e.g., to client devices 150 and 152). For example, the server environment 100 can provide web resources such as HTML, JavaScript, images, video content, and/or other web content in response to a web page request from a client device (e.g., a client device running a web browser application).

The server environment 110 may be operable to maintain (e.g., store in one or more servers) user profiles 120, . . . , 122. Each of the user profiles 120, . . . , 122 may be used to store data associated with a user and one or more devices associated with the user. For example, user profile 120 may store information identifying devices (e.g., 150, . . . , 152) used by user A. Additionally, the user profile 120 may also include browsing information 128. The browsing information 128 may include one or more databases (or other types of storage), for example, uniform resource locator (URL) information 130, scrolling location information 132, document object model (DOM) element information 131, as well as other web page state information 134 related to a web page being viewed at one or more of the client devices 150, . . . , 152. Example DOM elements 131 may include various interactive DOM elements, such as action buttons, image maps, text fields, combo boxes, hyper-links, as well as other types of DOM elements associated with a DOM for a web page being viewed at a client device.

The scrolling location 132 may include information indicating a current scrolling position (or location) (e.g., 154) associated with a currently viewed web page. For example, if a web page with URL X is being viewed at web browser 153 launched at client device 150, as the user scrolls through the web page, the scrolling location 154 will change. In this regard, the scrolling location is indicative of web page data that is within a viewport of (i.e., it is currently visible on) the device display. Even though FIG. 1 illustrates only vertical scrolling (e.g., 154), the application is not limited in this regard and other types of state information may be tracked as well, such as horizontal scrolling, sub-menu scrolling information (or other scrolling layer data), page zoom information, and so forth.

Even though the URL 130, the DOM element 131 and the scrolling location 132 are illustrated separately from the web page state 134, in some implementations they may be implemented as part of the web page state 134. The browsing information 128 may be updated periodically (e.g., automatically) so that the latest browsing information for a currently viewed web page is stored within the user profile 120. Additionally, the browsing information 128 may be updated based on web page state information requested from one or more of the user devices 150, ..., 152 displaying the web page, or web page state information communicated (e.g., pushed to the server environment 110) by one or more of the client devices 150, ..., 152 that are displaying (and updating, i.e., scrolling through) the web page associated with browsing information 128.

The example environment 100 further includes client devices 150 and 152. For example, the client devices 150 and 152 (e.g., a laptop, desktop, notebook, phone, tablet, or other type of computing device) can run web browser applications 153 and 163, respectively, for loading web pages obtained, via the network 140 (e.g., the Internet), from the server environment 110.

In operation, the client device 150 requests a web page from a web server or a content server within the server environment 110, and receives web page resources for the requested web page. For example, a user of the client device 150 can enter a URL (e.g., URL X) for the web page into a web browser application (e.g., web browser 153) running at the client device 150 to initiate the web page request. In response, the client device 150 can receive web page resources for the requested web page, which can comprise HTML, JavaScript, Cascading Style Sheet (CSS) information, images, and/or other web content.

The client device 150 may periodically send information associated with the browsing session open with browser 153 to the server environment 110 for storage in the user profile 120. For example, the client device 150 may communicate the requested web site URL (e.g., URL X) as well as other web page state information to the server environment for storage as URL 130, scrolling location 132, DOM element 131, and/or other web page state information 134. Such communication for updating the browsing information 128 (e.g., as indicated by 1 and 2 in FIG. 1) may be performed periodically and may be initiated by the client device 150 or the server environment 110.

As user A is scrolling through the web page displayed in browser 153, the scrolling location 154 and the text displayed within the browser viewport change. In this regard, both the scrolling location 154 as well as the location of specific text within the viewport may be used to indicate the current scrolling state of the web page in browser 153. For example, at a given scrolling location 154, the text displayed at a specific portion of the viewport may be detected (e.g., text B 157 displayed in the top left corner of the viewport may be detected). After text 157 is detected, the DOM element 156 associated with such text 157 may be determined. For example, text 157 may be the title/banner for a DOM element, such as a button. Both the DOM element 156 (with or without the associated text 157) and the scrolling location 154 (and/or other state information, such as any of the state information 234 in FIG. 2) may be communicated to the user profile 120 as web page state information (step 2 in FIG. 1), for storage as DOM element information 131 and scrolling location information 132. Additionally, the DOM element 156 may also include information of the location of the element in the viewport (e.g., DOM element 156 is located in the top left corner of the viewport).

The user A may also use client device 152, which may be of device type that is different from client device 150. For example, client device 150 may be a tablet and client device 152 may be a smartphone. The client device 152 may also request the same web page as the page being displayed at device 150. For example, the client device 152 may request the web page from a web server or a content server within the server environment 110, and may receive web page resources for the requested web page. For example, the user of the client device 150 can enter a URL (e.g., URL X) for the web page into a web browser application (e.g., web browser 163) running at the client device 152 to initiate the web page request. In response, the client device 152 can receive web page resources for the requested web page, which can comprise HTML, JavaScript, Cascading Style Sheet (CSS) information, images, and/or other web content.

In accordance with an example embodiment of the disclosure, "on device" and "cloud" tabs (as seen in FIGS. 3A-5) may be displayed as part of browsers 153 and 163. More specifically, the "on device" tab may provide a visual representation (e.g., an icon) of the browser sessions (e.g., browser tabs) open currently at browser running on the client device. The "cloud" tab may provide a visual representation of browser sessions open at other client devices associated with the same user (and the user's profile stored within the server environment 110).

In some embodiments, the web page displayed in browser 163 may be a device-optimized version of the web page displayed in browser 153 (e.g., the web page displayed in browser 163 may be a mobile version of the web page displayed in browser 153). The browsing session open at device 152 may be initiated based on content synchronization between client devices 150 and 152. More specifically, the user of device 152 may open the "cloud" tab on device 152 and may notice that browsing session with web site URL X is open at device 150. The user may activate the tab (e.g., press/click on the icon) in order to open a browsing session with the same web page at device 152. The device 152 may then access the browsing information 128 within profile 120, and may obtain the URL information 130, scrolling location information 132, DOM element information 131, and one or more of the web page state information 134 (as indicated by step 3 in FIG. 1). Browser 163 may open a new browsing window and display the web page with URL X, where the displayed page may be modified based on device characteristics (e.g., client device 152 may be a mobile device and the mobile version of the page may be used). The browsing information 128 may be accessed by device 152 or may be communicated by the server environment 110 to the client device 152 upon activation of the visual representation within the "cloud" tab.

After the device-optimized version of the web page is displayed, the scrolling position may be adjusted to scrolling position 168 (which may correspond to the last scrolling position 154 synchronized with the browsing information 128). However, since the web pages displayed at browsers 153 and 163 are different versions, the scrolling position 154 may not match the scrolling position 168. The DOM element 156 location may be used to further refine the page scrolling location. Initially, after the scrolling position is adjusted to position 168, a search may be performed within the viewport to detect text 157 and/or the DOM element 156 associated with the text. The DOM element 156 may be located at position 164. However, position 164 is not in the upper left corner of the viewport, which is the position stored as part of the DOM element 156 as displayed by browser 153. Therefore, an additional page scrolling adjustment may be performed so that the DOM element 156 is at position 166 (scrolling location moves from 168 to 170), which is in the top left corner of the viewport (matching the position of the DOM element 156 as displayed by browser 153). In this regard, content synchronization may be achieved, where the same page is displayed at both browsers 153 and 163, and the same scrolling positions are displayed at both browsers (even though one device may use a device-optimized version of the web page).

In accordance with an example embodiment of the disclosure, instead of tracking a location of a DOM element (e.g., 156), only the location of a text fragment (e.g., 157 or another arbitrarily selected text fragment appearing in a viewport of a web page) may be tracked and used for content synchronization between devices. More specifically, if a web page is modified (optimized) between devices, some DOM elements appearing in one version of the page may not be present in the optimized/modified version of the page. In this regard, instead of tracking the location of a DOM element, tracking a text fragment visible in the viewport may be tracked and used for synchronization of the page status across devices.

In accordance with an example embodiment of the disclosure, direct device-to-device communication may take place in order to implement content synchronization. For example, upon activating the visual representation of the browser session for browser 153 (as displayed in the "cloud" tab in device 152), the URL and other state information (communicated as steps 1 and 2 in FIG. 1) may be communicated from device 150 to device 152 (via network 140), as indicated by 171 in FIG. 1. After the device-optimized web page is displayed by browser 163 at client device 152 (with scrolling position adjustment so that the DOM element 156 location is the same at both devices 150 and 152), any changes made to the page in browser 163 may result in a notification being displayed at client device 150 (e.g., as seen in FIG. 3B) to accept (i.e., synchronize with) or reject the changes made at device 152.

In some embodiment, multimedia content synchronization may take place between devices, based on the techniques discussed herein. More specifically, the first client device 150 may be playing a multimedia content (e.g., audio or video file) on an application installed at the client device 150. The playback location (as well as other state information associated with multimedia content processing at the device 150) may be continuously tracked and stored. After the playback is stopped, the multimedia content state information (e.g., last playback location (e.g., last playback elapsed time) may be communicated to the second device and used to resume playback of the content at the second device.

FIG. 2 is a block diagram depicting an example environment for synchronizing content between devices of the same type, in accordance with an example embodiment of the disclosure. Referring to FIG. 2, the example environment may be similar to environment 100 and may include client devices 202 and 204 (server environment 110 is not illustrated in FIG. 2 for clarity). The devices 202 and 204 may be of the same device type (e.g., both devices 202, 204 may be tablet devices, similar to client device 150).

In an example content synchronization scenario, the device 202 may run browser application 220 and may request a web page 221. After page 221 is displayed in browser 220, state information 234 about the page 221 may be acquired and stored at device 202 and/or communicated to the server environment (e.g., 110) for storage in a user profile (e.g., 120).

The state information 234 may include a URL information 235, information 236 about the DOM of the page, one or more DOM elements 238 associated with the DOM 236, and one or more DOM attributes associated with the DOM elements 238. The state information 234 may also include current scrolling layer information 242, cookies 244 associated with the web page 221, domain specific storage information 246, JavaScript engine state information 248 (e.g., dynamic changes in one or more page elements based on user interaction), cascading style sheet (CSS) information 250, and user data 251. Other web page state information may also be included as part of the state information 234. The scrolling layer information 242 may include vertical scrolling state information (e.g., 154), horizontal scrolling state information, sub-scrolling information (e.g., vertical and/or horizontal scrolling within sub-menus), and so forth.

The user data 251 may include, for example, user-selected data (e.g., data identifying one or more user-selected menus or sub-menus within the web page) and user-entered data (e.g., data entered by the user on the web page, such as entered text in connection with an email, a form-field on an electronic form, or any other type of data entered by the user while the browser is displaying the given web page). In this regard, user data 251 may be part of the web page state 234, and may be synchronized from one device to another (e.g., a user may start writing an email or completing an online form, and after content synchronization, the email data or form completed at one device will appear on the second device so the user can complete the data entry at the second device). As another example, a user may have selected a sub-menu within a page, applied horizontal and/or vertical scroll within the sub-menu, and/or may have applied zoom to the sub-menu or the entire page. After synchronization, the page (with the selected sub-menu, scrolling and zoom info as last appeared at the first device) will appear in the same way at the second (synchronized) client device.

The user of device 202 may also activate device 204 and may request the same web page be displayed at device 204 (i.e., the user may request content synchronization from device 202 to device 204). The web page state information 234 may then be communicated from device 202 to device 204 (e.g., via network 140). Optionally, the device 204 may request the state information 234 from the user profile (e.g., 120, maintained by the server environment 110), or the state information 234 may be automatically pushed (e.g., upon activating a visual representation of the browsing session for browser 220 in a "cloud" tab at device 204) by device 202 or by the server environment (e.g., 110) (the communication of the state information from device 202 to device 204 is indicated by steps 1 and 2 in FIG. 2).

The web browser 260 may then use the received state information 234 to launch the web page 231, using the same web page URL (e.g., S1) and scrolling location (e.g., S2) as used by the browser 220.

Figure 3B:
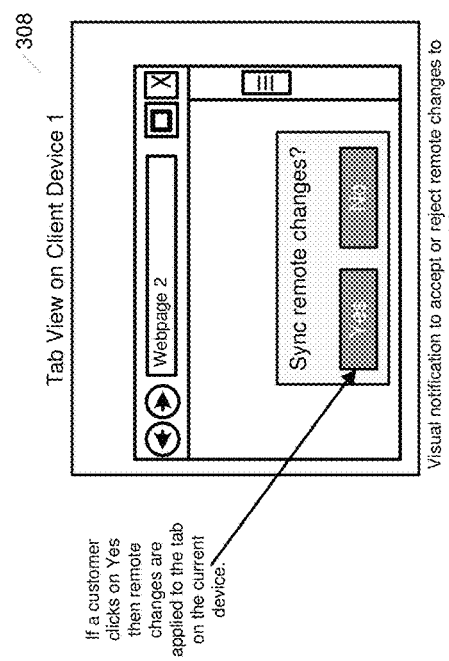
FIG. 3B illustrates an example user interface which may be used for accepting or rejecting remote changes to an open tab.

FIG. 3A is a block diagram depicting user interfaces which may be used when opening a tab not present at a current device. Referring to FIG. 3A, at 302, "on device" and "cloud" tabs are illustrated for client device 1, with the "on device" pane being selected and showing the tab for webpage 1 as active on client device 1. The user can then tap on the "cloud" pane to switch to view 304, to show tabs of webpages active on other client devices associated with the user account. More specifically, webpages 2 and 3 are shown as active on other devices of the user. After the user taps on the webpage 2 tab in the "cloud" pane, at 306, webpage 2 is synchronized to (and loaded on) the client device 1 for display (with synchronized scrolling location, as explained in reference to FIGS. 1-2).

FIG. 3B illustrates an example user interface which may be used for accepting or rejecting remote changes to an open tab. Referring to FIG. 3B, webpage 2 shows as active on client device 1. However, the same webpage 2 may have been open and active on another client device associated with the same user. The user may perform additional changes to the webpage 2 at the other device (e.g., scroll to a different page location). A notification (as seen at 308) may be displayed at client device 1, requesting authorization to perform synchronization of the remote changes made to webpage 2 at the other device. If the user selects "yes" (i.e., authorizes synchronization), webpage 2 at client device 1 will be synchronized with webpage 2 as displayed at the other client device (i.e., scrolling location at device 1 will be adjusted to match scrolling location at the other device).

Figure 4:
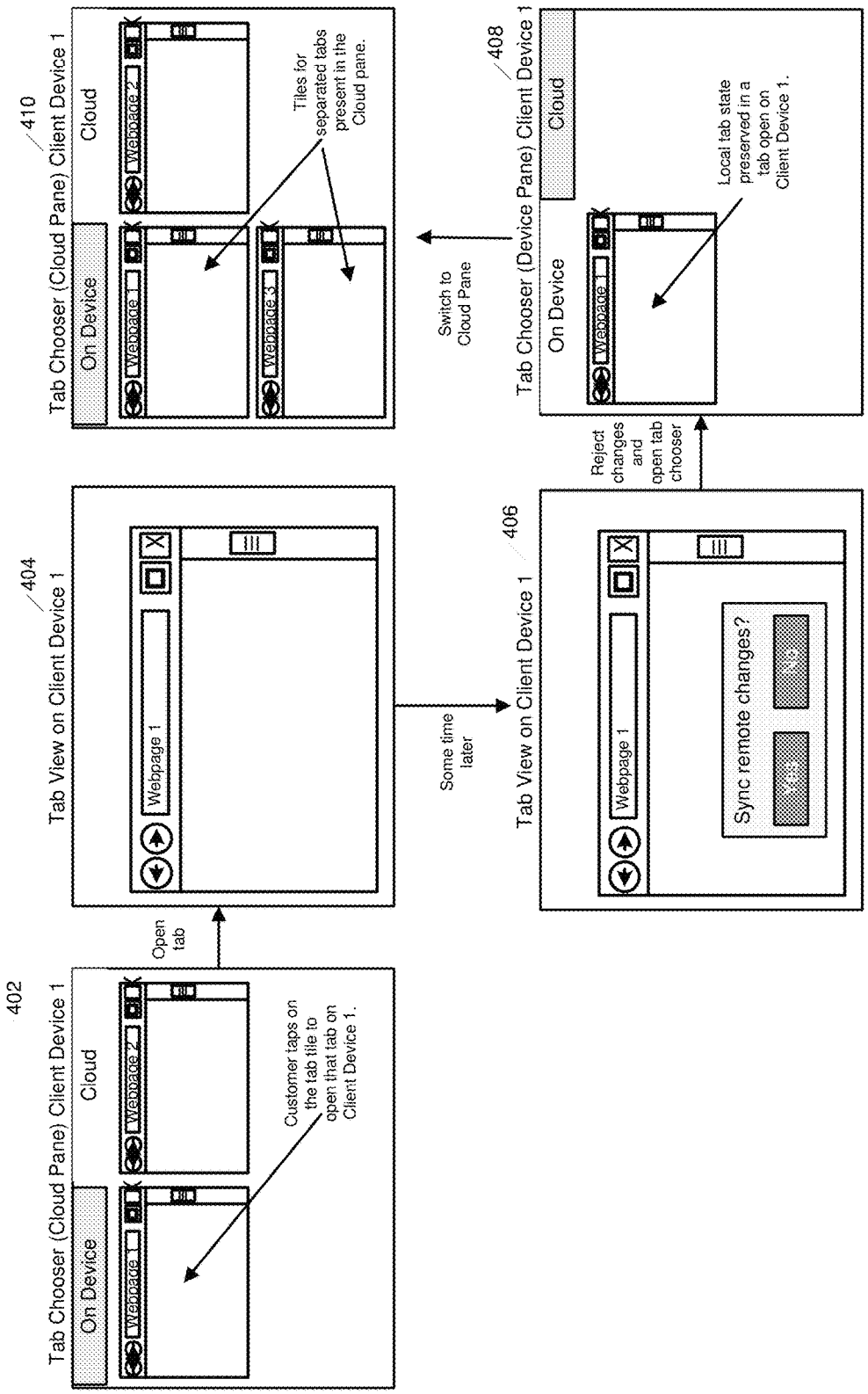
FIG. 4 illustrates an example user interface which may be used to show the tab view and tab chooser view when a user rejects a remote change.

FIG. 4 illustrates an example user interface which may be used to show the tab view and tab chooser view when a user rejects a remote change. Referring to FIG. 4, at 402, the user selects the "cloud" pane on device 1, and taps (selects) webpage 1 for display at device 1 (webpage 1 is active at another client device). At 404, webpage 1 is opened at device 1. At a later time (at 406), the user may have changed webpage 1 at the other device by opening a new page (webpage 3), and a synchronization request may be displayed at device 1, requesting authorization to synchronize webpage 1 at device 1 with the new webpage 3 displayed at the other device (i.e., close webpage 1 at device 1 and display webpage 3 as displayed by the other device). At 408, the user rejects the synchronization request, and the "on device" pane shows the webpage 1 tab as still active on device 1. At 410, the "cloud" pane on device 1 now shows both the webpage 1 tab as well as the webpage 3 tab open at the other device.

Figure 5:
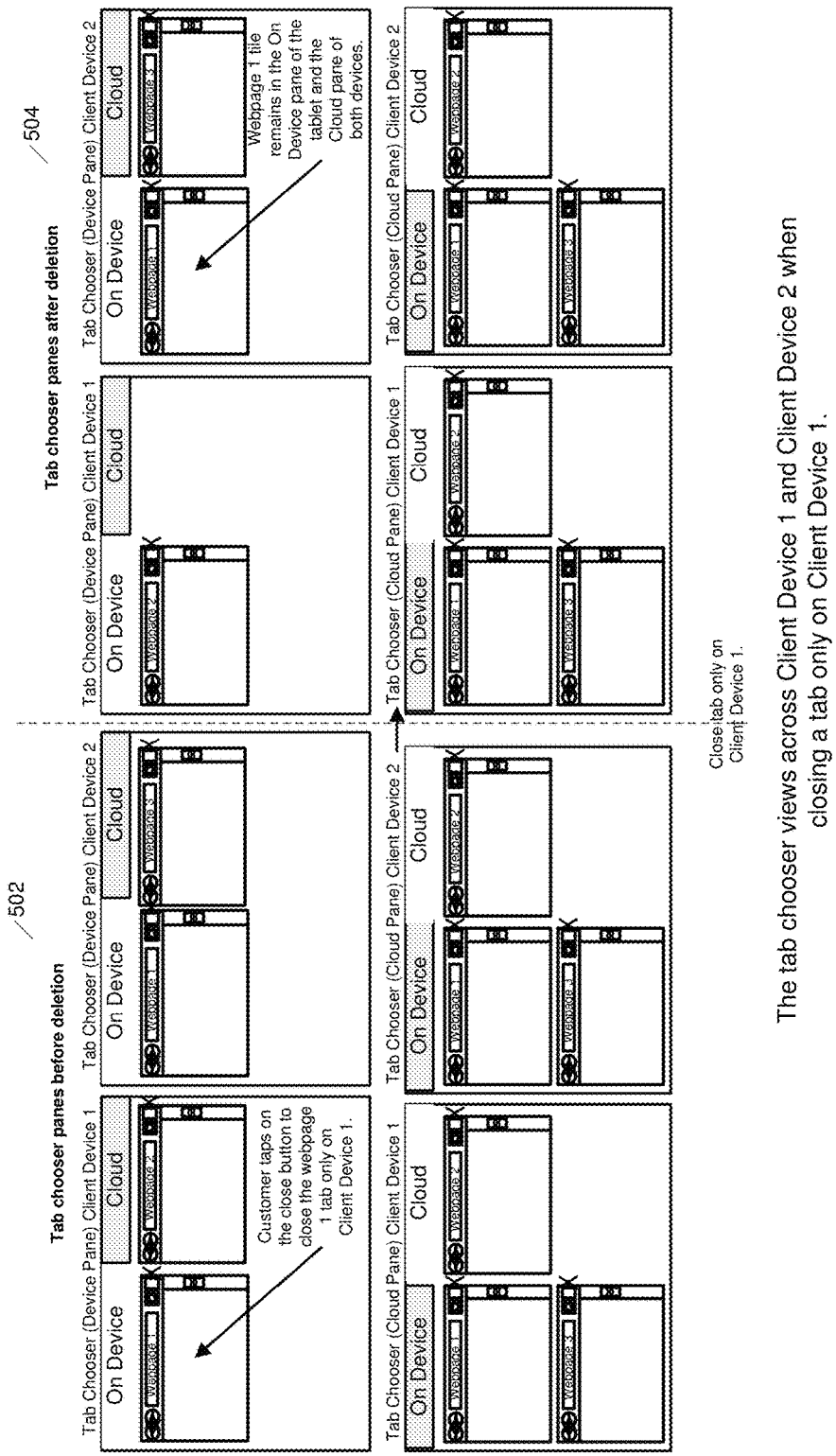
FIG. 5 illustrates an example user interface which may be used to show the tab chooser views across two different types of devices when closing a tab on one of the devices.

FIG. 5 illustrates an example user interface which may be used to show the tab chooser views across two different types of devices when closing a tab on one of the devices. Referring to FIG. 5, the tab chooser panes for devices 1-2 before deletion of a tab are illustrated at 502. As seen in FIG. 5, the "on device" panes for devices 1 and 2 indicate webpages 1 and 2 active on device 1, and webpages 1 and 3 active on device 2. Each of the "cloud" panes of devices 1 and 2 indicate webpages 1-3. The user may then close webpage 1 active on device 1.

The tab chooser panes after the webpage 1 deletion are indicated at 504. More specifically, the "on device" pane at device 1 now indicates only webpage 2 as active, and the "on device" pane of device 2 indicates webpages 1 and 3 as open in device 2. Each of the "cloud" panes of devices 1 and 2 indicate webpages 1-3.

Figure 6:
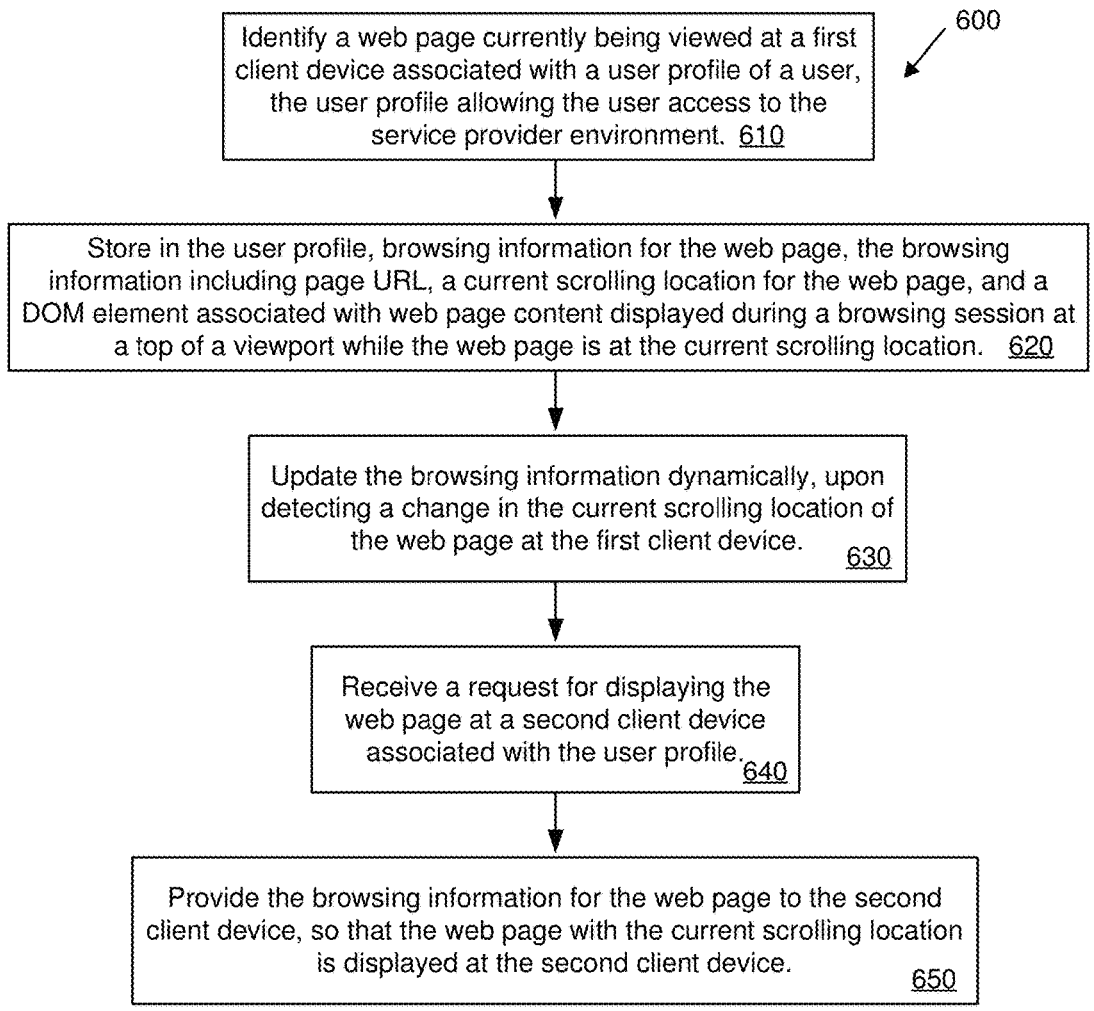
FIGS. 6-8 are flow charts of example methods for detecting potential user actions from a web page, in accordance with an example embodiment of the disclosure.
Figure 7:
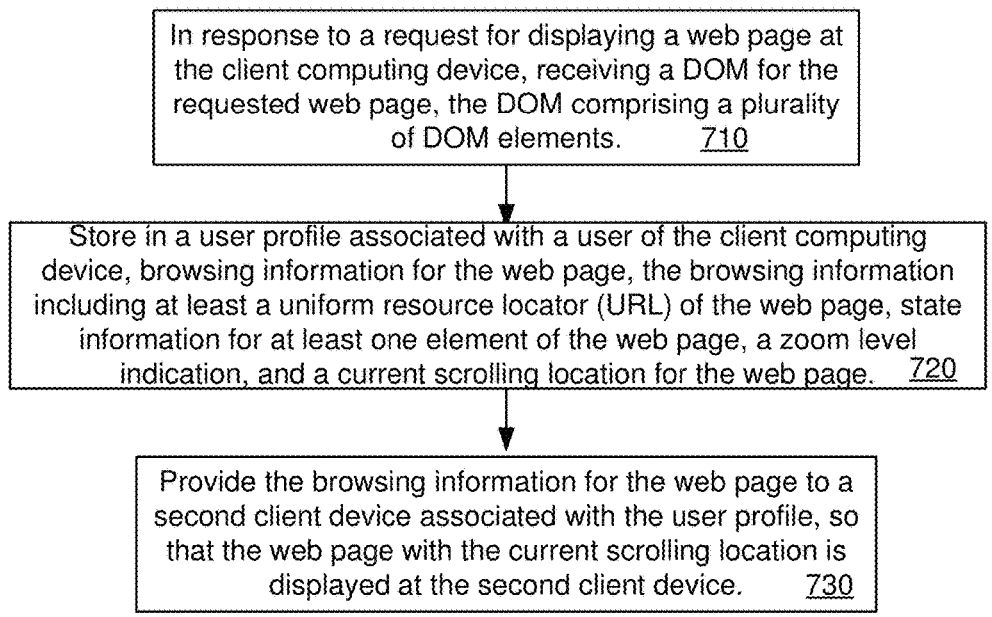
Figure 8:
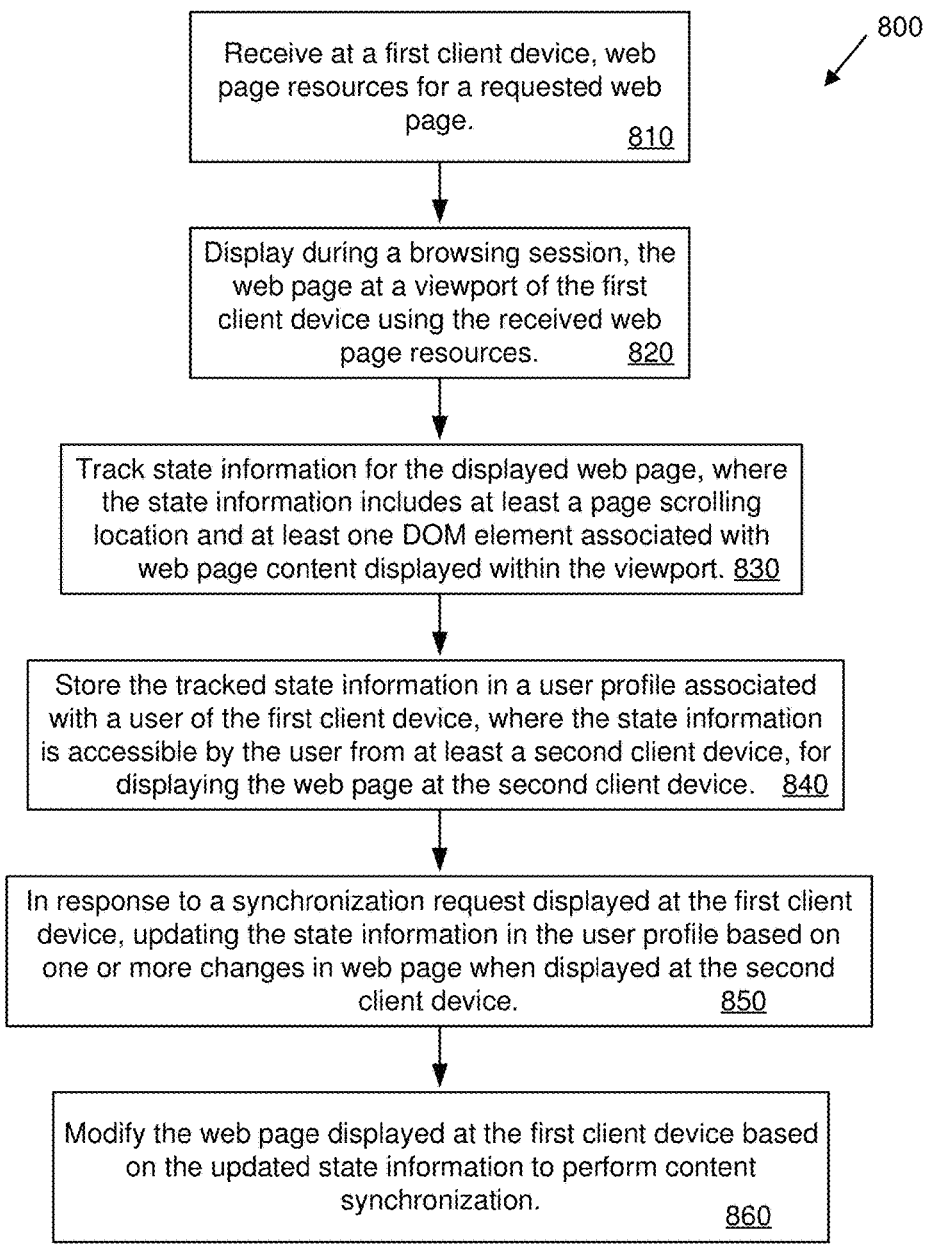

FIGS. 6-8 are flow charts of example methods for detecting potential user actions from a web page, in accordance with an example embodiment of the disclosure. Referring to FIGS. 1-2 and 6, the example method 600 may start at 610, when a web page (e.g., page with URL X) currently being viewed at a first client device (e.g., 150) associated with a user profile (e.g., 120) of a user may be identified. For example, the web page identification may be performed by the server environment 110 or the client device 152 (e.g., by viewing a "cloud" pane active at device 152. The user profile (e.g., 120) may allow the user access to the service provider environment (e.g., 110). At 620, the browsing information for the web page (with URL X) may be stored as part of the browsing information 128 in user profile 120. The stored browsing information may include a uniform resource locator (URL) of the web page (e.g., URL X stored as URL information 130), a current scrolling location (e.g., 154) for the web page (stored as scrolling location information 132), and at least one document object model (DOM) element (e.g., DOM element 156 stored as DOM element information 131). The at least one DOM element (e.g., 156) may be associated with web page content (e.g., text B, 157) displayed during a browsing session at a top of a viewport while the web page is at the current scrolling location (as seen in browser 153 in FIG. 1). Alternatively, instead of tracking the location of the DOM element 156, the location of a text fragment (e.g., 157) may be tracked instead and used for content synchronization. At 630, the server environment 110 (or the client device 153) may update the browsing information (128) dynamically, upon detecting a change in the current scrolling location of the web page at the first client device (150). At 640, the client device 150 (or the server environment 110) may receive a request for displaying the web page at a second client device (e.g., 152) associated with the user profile (120). At 650, the browsing information (128) for the web page may be provided (e.g., from the server environment 110 or the client device 150) to the second client device (152), so that the web page with the current scrolling location is displayed at the second client device. The scrolling location may be further adjusted based on the location of a DOM element within the viewport (or the location of the text fragment), as explained in reference to FIG. 1.

Referring to FIGS. 1-2 and 7, the example method 700 may start at 710, when in response to a request for displaying a web page at the client computing device (e.g., 150), a document object model (DOM) for the requested web page may be received at the client device 150 (e.g., from the server environment 110). The DOM may include a plurality of DOM elements (e.g., DOM element 156). At 720, browsing information for the web page (e.g., page with URL X) displayed at client device 150 may be stored in a user profile (e.g., as part of the browsing information 128 within user profile 120) associated with a user of the client computing device 150 (e.g., user A). The browsing information may include at least a uniform resource locator (URL) of the web page (e.g., URL X stored as part of the URL information 130), state information for at least one element of the web page (e.g., JavaScript engine state or state of one or more dynamic elements in the web page), a zoom level indication for the web page, and a current scrolling location (e.g., 154) for the web page (e.g., stored as part of the scrolling location information 132). At 730, the browsing information (e.g., information stored as the browsing information 128) for the web page may be provided to a second client device (e.g., 152) associated with the user profile (e.g., 120), so that the web page with the current scrolling location is displayed at the second client device (as seen in reference to FIGS. 1 and 2).

Referring to FIGS. 1-2 and 8, the example method 800 may start at 810, when web page resources for a requested web page (e.g., page with URL X) are received at a first client device (e.g., device 150). At 820, the requested web page may be displayed during a browsing session at a viewport of the first client device (150) using the received web page resources. At 830, state information for the displayed web page may be tracked (e.g., by the server environment 110 or the client device 150). The state information that is tracked may include at least a page scrolling location (e.g., 154) and at least one DOM element (e.g., 156) associated with web page content (e.g., text B, 157) displayed within the viewport (e.g., text 157 is displayed at the upper left corner of the viewport for browser 153). At 840, the tracked state information may be stored in a user profile (e.g., 120) associated with a user of the first client device (e.g., storing URL information 130, scrolling location 132, DOM element information 131 and/or other web page state information 134 as part of the browsing information 128). The state information may be accessible by the user from at least a second client device (e.g., client device 152), for displaying the web page at the second client device. At 850, in response to a synchronization request displayed at the first client device (e.g., seen in FIG. 3B), the state information (e.g., 128) in the user profile (120) may be updated based on one or more changes in the web page when displayed at the second client device (152). For example, after the web page is displayed at the second client device 152, the user may perform additional page scrolling, which may trigger the synchronization notice/request, as seen in FIG. 3B. At 860, after the user has accepted the synchronization request, the web page displayed at the first client device (150) may be modified (i.e., synchronized with the web page as displayed by the second client device 152), based on the updated state information, to perform content synchronization.

Figure 9:
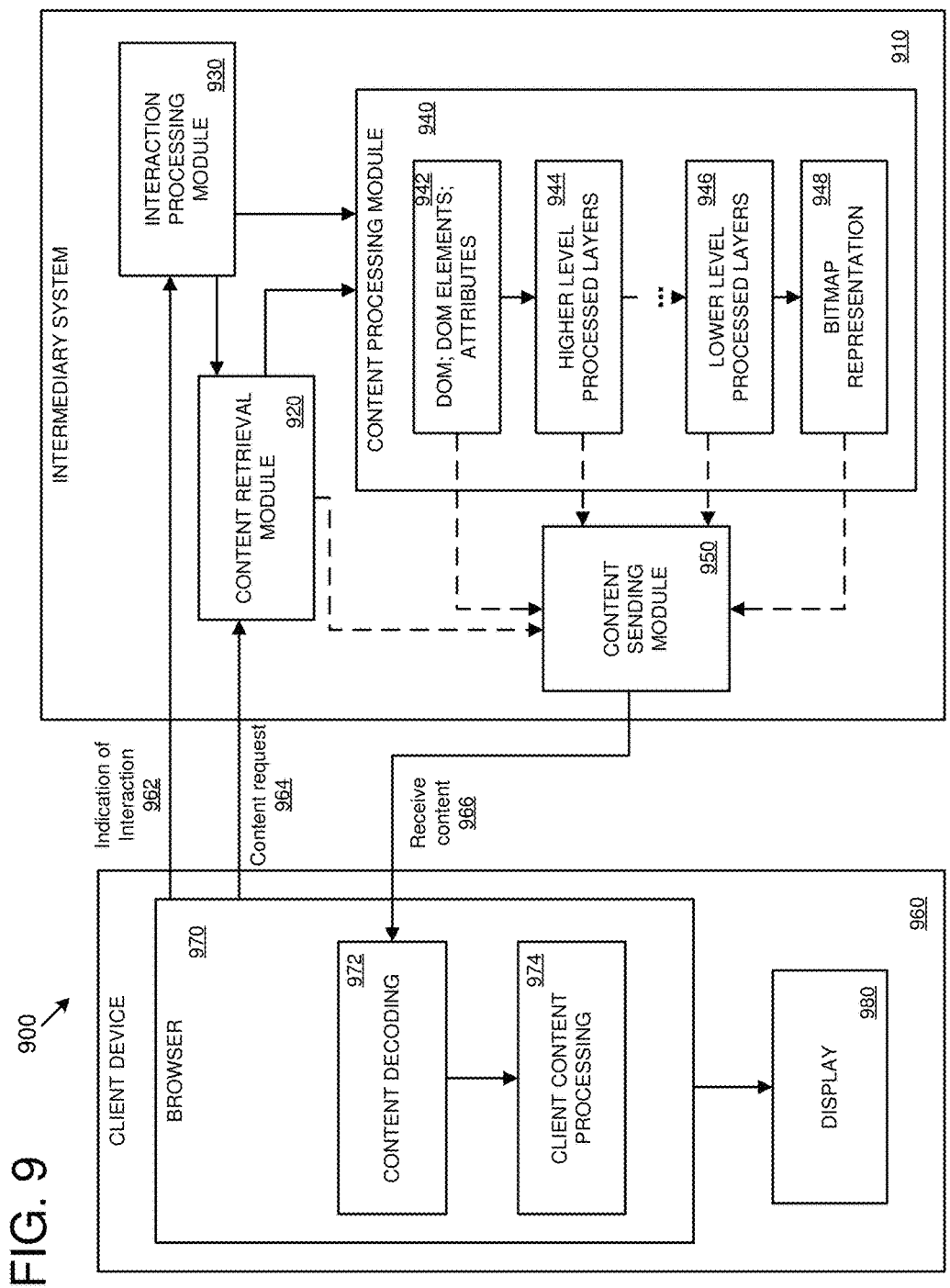
FIG. 9 is a block diagram depicting an example environment for web browsing using an intermediary system.

FIG. 9 is a block diagram depicting an example environment 900 in which content consumption activity (e.g., web browsing) is performed by a client device 960 in communication with an intermediary system 910. For example, the intermediary system 910 can be a headless browser system that performs web browsing operations independently, or in combination with, the client device 960.

The activity shown in FIG. 9 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various resources including location identifiers where the resources may be obtained (e.g., local identifiers and/or external identifiers such as addresses of servers where the resources may be obtained).

As illustrated, the browser 970 of the user device 960 can send a request for content (as indicated at 964) to the content retrieval module 920 of the intermediary system 910. The request for content can be, for example, a request for a web page generated when the user selects a user-selectable option directing the browser 970 to the web page URL. The request for content may be a standardized request, such as an HTML GET request that requests a resource at a particular location. In some embodiments, the request for content may be a request for layers (e.g., for processed layers). In some embodiments, the request for content can be accompanied by data representing capabilities of client device 960, for example one or more of processing capabilities, network connection parameters, and configuration of browser 970, to name a few.

In some embodiments, when intermediary system 910 receives the request for a content page, the intermediary system 910 can assess, for the content page, whether sending the content for the page as processed layers (e.g., at one or more levels of processing) to the client device 960 will reduce a user-perceived page load time relative to at least one alternative rendering technique. In some cases, the intermediary system 910 can determine whether a layer transfer rendering technique, in which processed layers are sent, is preferable for a given page load based on a number of factors, for example the speed, bandwidth, and type of network connection of client device 960 as well as characteristics of the content site. For example, intermediary system 910 can determine or predict whether the layer transfer rendering technique will reduce a page load time and/or bandwidth consumption compared to fully rendering the content page on the browser 970 (e.g., sending original HTML and associated web resources and having the browser 970 perform all of the rendering pipeline operations) or fully rendering the content page on the intermediary system 910 (e.g., performing all of the rendering pipeline operations and sending a bitmap representation to the client device 960).

The content retrieval module 920 can retrieve the content of the content page, for example HTML and associated resources, from content sources (e.g., web servers or content servers) and/or from local storage (e.g., cache). In some implementations, the network connection between the content retrieval module 920 and the content sources may be faster than the network connection between the client device 960 and the content sources, thereby reducing latency in rendering the content page for the user. The content source may be the origin content server, a CDN server, a proxy server, or some other source.

The content processing module 940 (e.g., implementing all or part of a rendering pipeline) can receive content (e.g., web page content) from the content retrieval module 920. The content processing module 940 can construct a Document Object Model (DOM) from of the received content, as indicated at 942. For example, the DOM can be constructed by converting HTML elements and any embedded resources into DOM nodes based on a DOM definition or specification. Creating the DOM can also involve parsing any available style data, such as style data obtained from a referenced CSS file or style data included in the HTML file. The content processing module 940 can also identify and provide one or more DOM elements and/or DOM element attributes together with the DOM (as indicated at 942).

Based on the DOM, different levels of processed layers can be generated, which can include higher level processed layers 944, lower level processed layers 946 and any processed layers in-between. While two levels of processed layers are depicted (944 and 946), different implementations can have more or fewer levels of processed layers. Different layers of a content page can encompass different two-dimensional areas of the content page (for example, cover different ranges of coordinates without overlapping). In some cases, one layer may partially or completely overlap another layer (for example, a background layer may be partially overlapped by any number of other layers, each of which may partially or completely overlap other layers, etc.). The content processing module 940 can also create a bitmap representation of the content (e.g., the web page) using the processed layers, as depicted at 948. Depending on the specific configuration being used, the content processing module 940 can create information for one or more of the levels of processing (e.g., 942, 944, 946, and/or 948). For example, the content processing module 940 may process the content to create a DOM (as depicted at 942) and a higher level processed layer (as depicted at 944) without any additional processing (e.g., without proceeding to lower level processed layers or bitmaps, as depicted at 946 and 948).

The intermediary system 910 supports sending content to the client device 960 at different levels of processing. For example, the content sending module 950 can receive raw content (e.g., original HTML content and associated resources) form the content retrieval module 920. The content sending module 950 can receive DOM information from the content processing module 940. The content sending module 950 can receive different levels of processed layers from the content processing module 940. The content sending module 950 can receive bitmap images from the content processing module 940. These different sources of content are indicated by the dashed lines within the intermediary system 910. Depending on the specific configuration being used, the content sending module 950 may receive content from one or more levels of processing (e.g., the content sending module 950 may only receive lower level processed layers for sending to the client device 960).

The content sending module 950 can encode the received content for sending to the client device 960. For example, the content sending module 950 can encode layers using a variety of layer encoding techniques and can examine the content of an individual layer to determine which encoding technique to use (e.g., to minimize bandwidth or page load time, for compatibility with a particular client device, etc.).

When the client device 960 receives the content from the content sending module 950 (as indicated at 966), the browser 970 decodes the content, as indicated at 972. Decoding the content can involve performing one or more decoding techniques corresponding to the encoding techniques used to encode the content.

The browser 970 can perform client content processing, as depicted at 974. For example, the browser 970 can perform processing operations similar to, or the same as, those performed by the content processing module 940. The type of processing performed by the browser 970 can depend on the level of processing performed by the intermediary system 910. For example, if the content processing module 940 created a DOM and then a higher level processed layer (e.g., a render layer tree) and sent the higher level processed layer to the client device 960, then the browser 970 could complete the processing by creating lower level processed layers (e.g., a graphics layer tree and a composited layer tree) and bitmaps for display, as depicted at 980 (e.g., in cooperation with a GPU of the client device 960, not depicted).

In some embodiments, the browser 970 performs content processing, as depicted at 974, to create decoded layers that can be provided to a layer compositor (not depicted) for generating instructions for display to display (as depicted at 980) a visual representation of the content page based on the layers. For example, a layer tree can be constructed so that the layers will be decoded and provided to the layer compositor in an order in which the layers should be rendered. For example, the layer compositor can assemble the decoded layers in the proper positioning and in the proper order (e.g., with a background layer behind other layers, foreground layers covering background layers with overlapping coordinates, and with an interactivity layer in front of the layers). The layer compositor can use the assembled layers to generate instructions to configure to display a visual representation of the content page.

The browser 960 can also detect user interaction with elements of the displayed content (e.g., user-selectable user-interface elements such as buttons and menus, scrolling, zooming, etc.) and send indications of user interaction to the interaction processing module 930, as indicated at 962. The browser 970 can also be configured to perform local rendering updates in some embodiments. As discussed above, a layer can be generated corresponding to a scrollable portion of the content page. Accordingly, the browser 970 can use the scrollable layer data to locally handle scrolling through the layer by updating the portion of the scrollable layer content that is displayed in the viewport, or boundary, of the scrollable layer. The browser 970 can also detect changing graphical content, for example in a GIF or video, and send a request for updated content to the intermediary system 910 if needed. In some embodiments the browser 970 may have received a URL corresponding to video content from the intermediary system 910, and accordingly may be able to handle the update to the portion of the content page including the video without sending a request to the intermediary system 910.

For any interactions that are not able to be handled locally by the browser 970 using the received content, the browser 970 can send the indications of user interaction, as depicted at 962, to the interaction processing module 930. The interaction processing module 930 can determine whether any updates to the visual representation of the content page are necessitated by the user interaction with the elements of the content. For example, the interaction processing module 930 can communicate with the content retrieval module 920 to obtain new or update content. The interaction processing module 930 can also communicate with the content processing module 940 to perform processing of content (e.g., an update to the DOM, an update to one or more processing layers, etc.) for sending back to the client device 960 in response to the interaction.

In some implementations, example environment 900 supports content synchronization across devices. For example, the intermediary system 910 and/or the client device 960 may perform the functionalities discussed in reference to FIGS. 1-2. More specifically, the intermediary system 910 may implement the modules and perform the functionalities of the server environment 110 (e.g., maintaining user profile information, updating browsing information (including web page state information) based on information received from a first device, and communicating the updated browsing information to at least a second device for synchronizing web page content between the two devices). The client device 960 may perform the functionalities of, for example, client device 150 (when browsing information including state data is collected from the device 150 and stored in a user profile) or client device 152 (when updated browsing information is communicated to the client device for purposes of launching the web page originating at device 150, and adjusting the web page state (e.g., scrolling position) based on the received updated browsing information).

Figure 10:
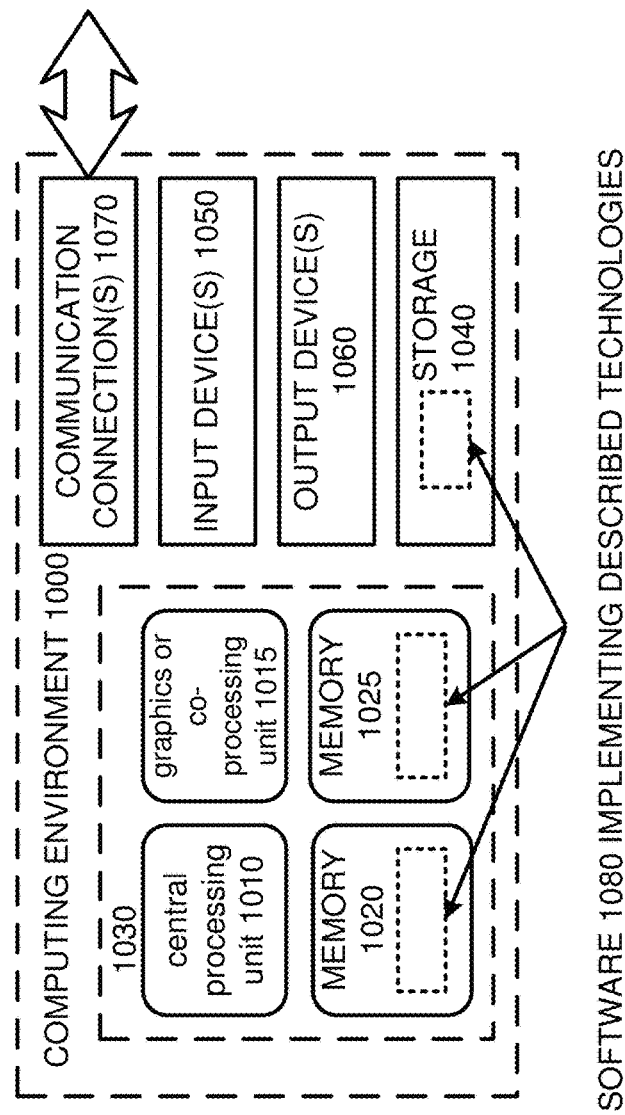
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit

1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a touch display or touchpad, a keyboard, a mouse, a pen, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method for synchronization of scrolling location across devices in a service provider environment, the method comprising:
    identifying a web page currently being viewed at a first client device associated with a user profile of a user, the user profile allowing the user access to the service provider environment;
    storing in the user profile, browsing information for the web page, the browsing information comprising:
        a uniform resource locator (URL) of the web page;
        a current scrolling location for the web page; and
        at least one document object model (DOM) element, the at least one DOM element associated with web page content displayed during a browsing session at a top of a viewport of the first client device while the web page is at the current scrolling location;
    updating the browsing information stored in the user profile dynamically, upon detecting a change in the current scrolling location of the web page at the first client device;
    receiving a request for displaying the web page at a second client device associated with the user profile; and
    providing the browsing information, comprising the URL, the current scrolling location, and the at least one DOM element, for the web page to the second client device, so that the web page with the current scrolling location is displayed at the second client device by locating the at least one DOM element or a text fragment associated with the at least one DOM element in a page layout displayed at the second client device and adjusting the current scrolling location of the web page displayed on the second client device so that web content associated with at least one DOM element or text fragment is displayed at a top of a viewport of the second client device.

2. The method according to claim 1, further comprising:
    receiving a request for the web page; and
    in response to the request, obtaining the document object model (DOM) for the requested web page, the DOM comprising a plurality of DOM elements.

3. The method according to claim 2, further comprising:
    receiving an indication of the web page content displayed at the top of the viewport of the first client device, while the web page is at the current scrolling location.

4. The method according to claim 3, further comprising:
    identifying the at least one DOM element from the plurality of DOM elements based on the received indication.

5. The method according to claim 1, further comprising:
    tracking the state information, while the web page is being displayed at the first client device.

6. The method according to claim 5, further comprising:
    upon detecting closing of the browsing session for the web page at the first client device, updating the browsing information with the tracked state information prior to the closing.

7. The method according to claim 1, wherein the second client device has a display configuration that is different from a display configuration of the first client device, and the method further comprises:
    in response to receiving the request for displaying the web page at the second client device, generating a modified page layout for the web page, the page layout optimized for display using the display configuration of the second client device.

8. A client computing device, comprising:
    one or more processing units;
    a memory coupled to the one or more processing units; and
    one or more network interfaces;
    the client computing device configured to perform operations for synchronization of scrolling location across devices in a service provider environment, the operations comprising:
        in response to a request for displaying a web page at the client computing device, receiving a document object model (DOM) for the requested web page, the DOM comprising a plurality of DOM elements;
        storing in a user profile associated with a user of the client computing device, browsing information for the web page, the browsing information comprising at least a uniform resource locator (URL) of the web page, state information for at least one element of the web page, and a current scrolling location for the web page, wherein the state information comprises an indication of at least one of the DOM elements or a text fragment located at a top of a viewport of the client computing device; and
        providing the browsing information, comprising the URL, the state information, and the current scrolling location, for the web page to a second client device associated with the user profile, so that the web page with the current scrolling location is displayed at the second client device by locating the at least one DOM element or the text fragment in a page layout displayed at the second client device and adjusting the current scrolling location of the web page displayed on the second client device so that web content associated with at least one DOM element or text fragment is displayed at a top of a viewport of the second client device.

9. The client computing device of claim 8, the operations further comprising:
    upon detecting a change in the browsing information while the web page is being displayed at the client computing device, communicating a web page update request at a second client computing device associated with the user profile.

10. The client computing device of claim 9, the operations further comprising:
    upon receiving a confirmation of the update request from the second client computing device, providing the changed browsing information to the second client device, the changed browsing information for updating the web page as displayed at the second client computing device.

11. The client device of claim 9, the operations further comprising:

maintaining at the client device, at least one browsing tab with a visual representation for each of a plurality web pages currently open at the second client device and/or other client devices associated with the user profile.

12. The client device of claim 11, the operations further comprising:
receiving a synchronization request at the client device for synchronizing remote changes made to at least one of the plurality of web pages.

13. The client device of claim 12, the operations further comprising:
upon receiving input accepting the synchronization request, updating the visual representation for the at least one of the plurality of web pages in the at least one browsing tab to reflect the remote changes;
receiving an input selecting the updated visual representation for the at least one of the plurality of web pages; and
displaying the at least one of the plurality of web pages on a display of the client device.

14. The client device of claim 8, wherein the browsing information further includes a location of the text fragment within the web page displayed at the client computing device, the operations further comprising:
tracking the location of the text fragment within the web page as displayed at the client computing device;
updating the browsing information upon change in the location of the text fragment; and
providing the location of the text fragment as part of the browsing information to the second client device for synchronization of the current scrolling location.

15. A computer-readable storage medium storing computer-executable instructions for synchronization of scrolling location across devices, the operations comprising:
receiving at a first client device, web page resources for a requested web page;
displaying during a browsing session, the web page at a viewport of the first client device using the received web page resources;
tracking state information for the displayed web page, wherein the state information comprises at least a page scrolling location and at least one DOM element associated with web page content displayed within the viewport;
storing the tracked state information, comprising the page scrolling location and the at least one DOM element associated with web page content displayed within the viewport, in a user profile associated with a user of the first client device, wherein the state information is accessible by the user from at least a second client device, for displaying the web page at the second client device;
in response to a synchronization request displayed at the first client device, updating the state information in the user profile based on one or more changes in the web page obtained from display of the web page at the second client device, wherein the web page displayed at the first client device is the same as the web page displayed at the second client device, and wherein the one or more changes comprise a page scrolling location of the web page displayed at the second client device; and
modifying the web page displayed at the first client device based on the updated state information to perform synchronization of the page scrolling location by locating at least one DOM element from the updated state information, or a text fragment associated with the at least one DOM element, in the web page displayed at the first client device and adjusting the page scrolling location so that web content associated with at least one DOM element or text fragment is displayed at a top of the viewport of the first client device.

16. The computer-readable storage medium according to claim 15, wherein the state information further comprises one or more of:
a document object model (DOM) for the requested web page;
one or more DOM elements associated with the DOM;
a uniform resource locator (URL) for the web page;
one or more cookies associated with the web page;
domain specific storage associated with the web page;
state information for one or more rendering engines; and
styling information associated with the web page.

17. The computer-readable storage medium according to claim 15, the operations further comprising:
upon detecting closing of the browsing session for the web page at the first client device, updating the user profile with the state information prior to the closing.

18. The computer-readable storage medium according to claim 15, the operations further comprising:
tracking at least one user actions performed at the first client device in connection with the displayed web page; and
storing the tracked at least one user actions within the user profile.

19. The computer-readable storage medium according to claim 18, the operations further comprising:
upon detecting closing of the browsing session at the first client device, communicating the tracked at least one user actions to the second client device; and
upon launching of the web page at the second client device, replaying the user actions at the second client device to perform synchronization of the page scrolling location and update the web page as displayed at the second client device.

* * * * *